United States Patent
Herbst et al.

(10) Patent No.: US 10,095,717 B2
(45) Date of Patent: Oct. 9, 2018

(54) DATA ARCHIVE VAULT IN BIG DATA PLATFORM

(71) Applicant: SAP SE, Walldorf (DE)

(72) Inventors: Axel Herbst, Eppingen (DE); Veit Bolik, Frankenthal (DE); Mathias Roeher, Helmstadt-Bargen (DE)

(73) Assignee: SAP SE, Walldorf (DE)

( * ) Notice: Subject to any disclaimer, the term of this patent is extended or adjusted under 35 U.S.C. 154(b) by 323 days.

(21) Appl. No.: 14/818,992

(22) Filed: Aug. 5, 2015

(65) Prior Publication Data

US 2017/0039227 A1    Feb. 9, 2017

(51) Int. Cl.
*G06F 17/30* (2006.01)

(52) U.S. Cl.
CPC .. *G06F 17/30309* (2013.01); *G06F 17/30336* (2013.01); *G06F 17/30569* (2013.01)

(58) Field of Classification Search
USPC ....... 707/608, 610, 640, 692, 705, 790, 813, 707/964, 674
See application file for complete search history.

(56) References Cited

U.S. PATENT DOCUMENTS

| | | | |
|---|---|---|---|
| 6,799,184 B2 | 9/2004 | Bhatt et al. | |
| 8,396,893 B2 | 3/2013 | Gaffga et al. | |
| 8,949,175 B2 | 2/2015 | Wu et al. | |
| 2005/0216421 A1* | 9/2005 | Barry | G06F 11/0709 705/64 |
| 2006/0136462 A1* | 6/2006 | Campos | G06F 17/30539 |
| 2011/0078227 A1* | 3/2011 | McAloon | G06F 11/3006 709/201 |
| 2012/0143912 A1 | 6/2012 | Horton et al. | |
| 2014/0067791 A1 | 3/2014 | Idicula et al. | |

(Continued)

OTHER PUBLICATIONS

Milena Ivanova et al, "Data Vaults: Database Technology for Scientific File Repositories", Computing in Science and Engineering, IEEE Service Center, Los Alamitos, CA, US, vol. 15, No. 3, May 1, 2013, pp. 32-42.

(Continued)

*Primary Examiner* — Sana A Al-Hashemi
(74) *Attorney, Agent, or Firm* — Fountainhead Law Group P.C.

(57) ABSTRACT

Embodiments relate to data archiving utilizing an existing big data platform (e.g., HADOOP) as a cost-effective target infrastructure for storage. Particular embodiments construct a logical structure (hereafter, "vault") in the big data platform so that a source, type, and context of the data is maintained, and metadata can be added to aid searching for snapshots according to a given time, version, and other considerations. A vaulting process transforms relationally stored data in an object view to allow for object-based retrieval or object-wise operations (such as destruction due to legal data privacy reasons), and provide references to also store unstructured data (e.g., sensor data, documents, streams) as attachments. A legacy archive extractor provides extraction services for existing archives, so that extracted information is stored in the same vault. This allows for cross queries over legacy data and data from other sources, facilitating the application of new analysis techniques by data scientists.

16 Claims, 9 Drawing Sheets

(56) References Cited

U.S. PATENT DOCUMENTS

2014/0195875 A1    7/2014  Resch et al.

OTHER PUBLICATIONS

Ron Duplain et al, "Data Vault: Providing Simple Web Access to NRAO Data Archives", Optical Sensing II, vol. 7019, Aug. 8, 2008, 10 pages.
Shivnath Babu et al, "Massively Parallel Databases and MapReduce Systems", Foundations and Trends in Databases, vol. 5, No. 1, Jan. 1, 2013, 108 pages.
European Search Report, dated Dec. 12, 2016, from a corresponding foreign application, EP 16001738.0, 9 pages.
Faerber, Franz et al, Towards a Web-scale Data Management Ecosystem Demonstrated by SAP HANA, ICDE Conference 2015, 978-1-4799-7964-6/15, (c) 2015 IEEE.

* cited by examiner

| order | position | quant. | price |
|---|---|---|---|
| PO1 | pos1 | 1kg | 5.00 |
| PO1 | pos2 | 50pc | 0.30 |
| PO2 | pos1 | 5m | 7.00 |

| order | name |
|---|---|
| PO1 | name1 |
| PO2 | name2 |
| PO3 | name1 |

| customer | street | Num |
|---|---|---|
| name1 | Astreet | 7 |
| name2 | Bstreet | 4 |

FIG. 4C

| VaultedAt: 2015.05.08 | Created: unknown | order:PO1 | customer:name1,street:Astreet,Num:7 | position: (pos1,quant:1kg,price:5.00, pos2,quant:50pc,price:0.30) |
| --- | --- | --- | --- | --- |
| VaultedAt: 2015.05.08 | Created: unknown | order:PO2 | customer:name2,street:Bstreet,Num:4 | position:pos1,quant:5m,price:7.00 |

FIG. 4D

DATA ARCHIVE VAULT IN BIG DATA PLATFORM

BACKGROUND

Unless otherwise indicated herein, the approaches described in this section are not prior art to the claims in this application and are not admitted to be prior art by inclusion in this section.

Embodiments relate to handling large data volumes, and in particular, to a vault archive implemented in a big data platform.

With the evolution in sophistication and complexity of databases, stored data has become available for visualization and analysis in increasingly large volumes. Such "big data" may comprise millions or even billions of different records.

Examples of big data can include unstructured postings and shared documents available from social media. However, other types of structured data can also be stored, including rapidly increasing volumes of financial data for processing by business management systems.

Even though data of many kinds (e.g., unstructured and structured) is growing exponentially, it may be desired to retain that data for many years. This desire to archive data may be attributable to business value considerations and/or legal reasons.

Inexpensive long-term storage of historical data calls for the ability to use those data assets—for example to maintain the information that the data represents, and allow for flexible data analysis (reporting). This data storage ability is desired across even the classical silos.

In one example, it may be necessary to store a communication history together with the closing of a deal. In another example, it may be necessary to relate sensor data to a maintenance request.

Conventionally, storing such large volumes of data can be expensive. With such large data volumes at issue, difficulties can arise in preserving the data in a manner that allows cross-querying, where the data is stored unrelatedly in different silos. It can also be a challenge to keep track of the historical state of the data, given changes in the system environment over time, and also evolution in the data structures themselves.

SUMMARY

Embodiments relate to data archiving utilizing an existing big data platform (e.g., HADOOP) as a cost-effective target infrastructure for storage. Particular embodiments construct a logical structure (hereafter, "vault") in the big data platform so that a source, type, and context of the data is maintained, and metadata can be added to aid searching for snapshots according to a given time, version, and other considerations. A vaulting process transforms relationally stored data in an object view to allow for object-based retrieval or object-wise operations (such as destruction due to legal data privacy reasons), and provide references to also store unstructured data (e.g., sensor data, documents, streams) as attachments. A legacy archive extractor provides extraction services for existing archives, so that extracted information is stored in the same vault. This allows for cross queries over legacy data and data from other sources, facilitating the application of new analysis techniques by data scientists.

An embodiment of a computer-implemented method comprises, an engine of a big data platform receiving from an application layer, a first input comprising a plurality of fields organized in a first data structure. The engine receives from the application layer, context information relevant to the first data structure. The engine stores in a vault of the big data platform, values of the plurality of fields and the context information organized as a second data structure different from the first data structure.

A non-transitory computer readable storage medium embodies a computer program for performing a method comprising an engine of a big data platform an engine of a big data platform receiving a first input comprising a plurality of fields organized in a first data structure. The engine receives context information relevant to the first data structure. The engine stores in a vault of the big data platform, values of the plurality of fields and the context information organized as a second data structure different from the first data structure.

A computer system according to an embodiment comprises one or more processors and a software program, executable on said computer system. The software program is configured to cause an engine of a big data platform to receive a first input comprising a plurality of fields organized in a first data structure. The software program is further configured to cause the engine to receive context information relevant to the first data structure, and to store in a cluster of the big data platform, values of the plurality of fields in a plurality of storage nodes, and store the context information in a vault catalog, organized as a second data structure different from the first data structure.

In some embodiments the vault comprises a cluster of storage nodes and calculation nodes.

In particular embodiments the context information is stored in a catalog of the vault, and values of the plurality of fields are stored in a subset of the storage nodes.

According to various embodiments the values are denormalized.

Certain embodiments further comprise the engine handling the second data structure without processing the context information.

In some embodiments the context information comprises time information, version information, or structure information.

Various embodiments further comprise the engine processing the context information to handle the second data structure.

According to particular embodiments the context information comprises compliance information.

Some embodiments further comprises the engine receiving the first data structure from a database, and the engine aging the first data structure within the big data platform.

The following detailed description and accompanying drawings provide a better understanding of the nature and advantages of embodiments.

BRIEF DESCRIPTION OF THE DRAWINGS

FIG. 4C shows an example of table data.

FIG. 4D shows denormalization of the exemplary table data of FIG. 4C.

DETAILED DESCRIPTION

Described herein are methods and apparatuses configured to perform data archiving in a big data platform. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments relate to data archiving utilizing an existing big data platform (e.g., HADOOP) as a cost-effective target infrastructure for storage. Particular embodiments construct a logical structure (hereafter, "vault") in the big data platform so that a source, type, and context of the data is maintained, and metadata can be added to aid searching for snapshots according to a given time, version, and other considerations. A vaulting process transforms relationally stored data in an object view to allow for object-based retrieval or object-wise operations (such as destruction due to legal data privacy reasons), and provide references to also store unstructured data (e.g., sensor data, documents, streams) as attachments. A legacy archive extractor provides extraction services for existing archives, so that extracted information is stored in the same vault. This allows for cross queries over legacy data and data from other sources, facilitating the application of new analysis techniques by data scientists.

Figure 1:
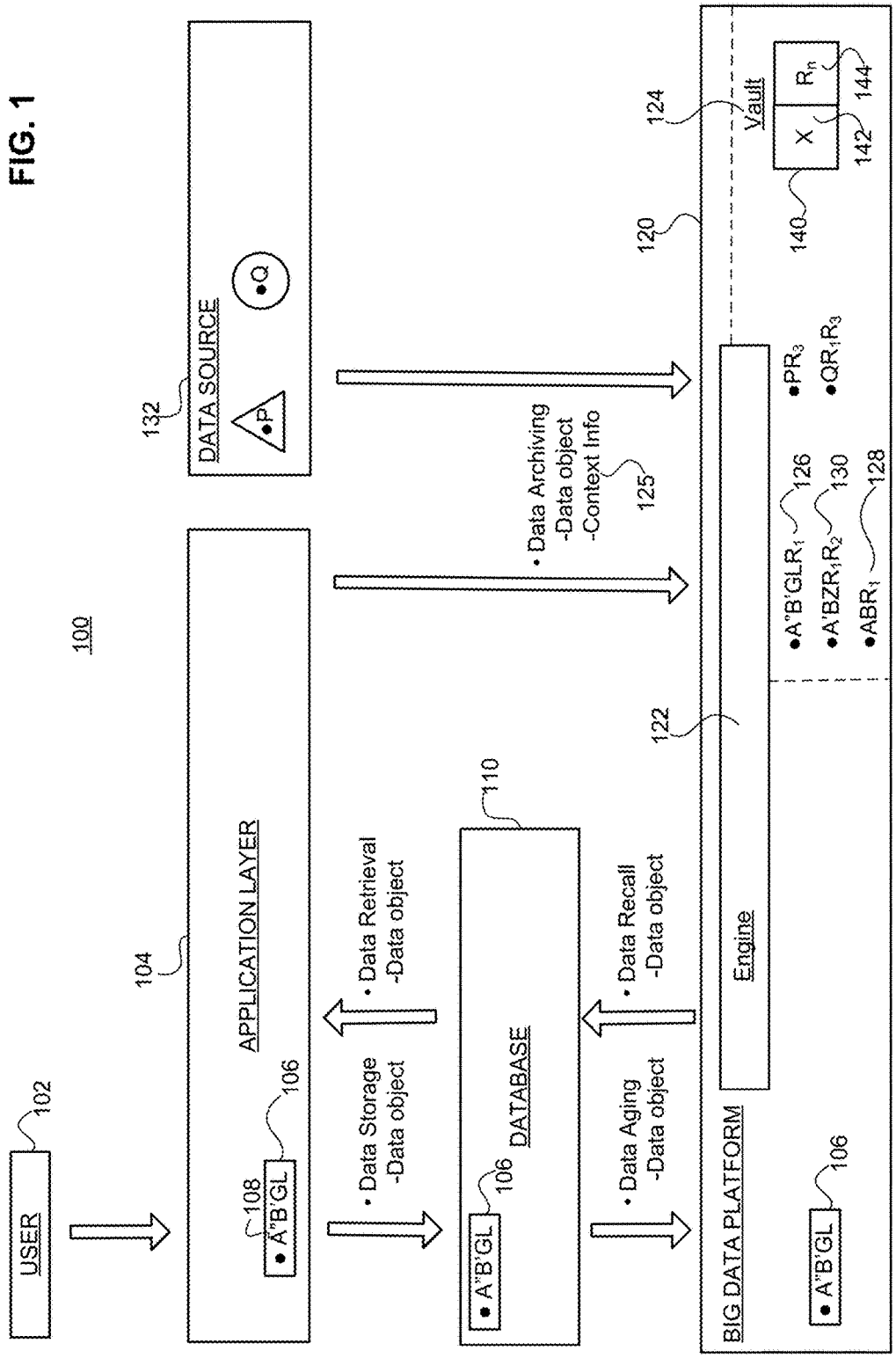
FIG. 1 shows a simplified view of a system according to an embodiment.

FIG. 1 presents a simplified view of a system 100 according to an embodiment. In particular, a user 102 interacts with an application layer 104 to perform handling and analysis of data.

The data being manipulated by the application layer, is typically organized into a larger data object 106 comprising a plurality of data fields 108. Here the data object comprises the individual data fields A", B', G, and L, and its general structure is indicated by a rectangular shape.

As part of its manipulation and analysis in the application layer, the data object is typically stored and retrieved in an underlying database 110. Data is typically stored in the database for access over relatively short periods, on the order of months to a few years.

However, over longer periods (e.g., 5+ years) the database and/or the data object may evolve. For example, the database may be updated to exhibit added features/functionality.

The data object may also change over time to reflect modified/different fields. For example, here the data object 106 (•A"B'GL) has evolved from earlier structures.

One earlier data structure (•A'BZ) included previous incarnations of the A and B fields, and a different field Z. A still earlier data structure (•AB) included only fields A and B in their original form.

As described herein, it may be desirable to archive these earlier data structures for reference at some future date, even over decades-long periods of time. For various reasons, however, (e.g., database evolution, lack of foreign key storage, cost), the database itself may not be a cost-effective vehicle for archiving data over such long periods.

Accordingly, FIG. 1 further shows the application layer as in communication with a big data platform 120. This big data platform comprises an engine 122, and further comprises a vault 124. The engine is configured to receive a data object and context information 125 relevant thereto, and to store same together within the archive for retrieval over long periods.

Specifically, the vault is configured to store data (e.g., as previously present in various data objects), together with relevant reference data $R_n$, providing various pieces of contextual information regarding that data. FIG. 1 shows the vault as comprising a cluster 140 comprising a first plurality of nodes 142 configured to store data object content, and a second plurality of nodes 144 (e.g., a catalog) configured to store associated reference information.

For example, FIG. 1 shows a copy 126 of the data A"B'GL of the current data object, archived together with reference data $R_1$ indicating a time (date) of archiving of that data. Taken together, the data object 126 (•A"B'GLR$_1$) can be referred to as a "snapshot". The large capacity volume of the big data platform allows many such snapshots of the same data object to be reliably stored in the vault, over long periods.

Even considering the large capacity of the big data platform, embodiments can archive data efficiently, conserving storage resources by allowing state of the art techniques (e.g., for compression, delta storage, or deduplication) to be applied in order to store identical/common/unchanged parts of the snapshots only once.

Moreover, the vault can also be utilized to archive snapshots of different versions of the data object. Here, a snapshot of an earlier-version data object 128 (•ABR$_1$) is also stored in the vault.

The reference information stored in the vault associated with the data, is not limited to the time information just discussed. For example, the archived data object 130 (•A'BZR$_1$R$_2$) may additionally include another type of reference information, for example identifying the specific version of the application software for which data object 130 was designed to be compatible. Such reference information can be valuable for recognizing the function of the archived data object many years after the fact.

A wide variety of reference information can be stored in the vault with the archived data. For example, data objects •P and •Q from a different source 132 entirely, may be relevant to the application and thus also sought to be archived.

Those data objects •P and •Q, however, may be organized according to a schema that is fundamentally different from that utilized by the current application (as indicated by their respective triangular and circular shapes). Accordingly, FIG. 1 also shows the vault as storing data objects •PR$_3$ and •QR$_1$R$_3$ that include reference information specifically identifying those different data object organizational schemas for future recognition.

Of course the nature of the reference information associated with the archived data is not limited to the time, software version, or data object organizational schema, and may include any type of information.

Such archived information may be active or passive. Active archived information is "understood" and processed/enforced by the engine. Examples of active archived information can include but are not limited to:

lifetime conditions (e.g., expiry);
access policies;
compliance policies; and
others.

Thus a compliance property "legal hold active" may serve to prevent a client from modifying archived data. In another example, a retention property "expiry" that includes a future date, protects the archived data from being deleted. Also, access policies bound to the data in the vault serve to control visibility of the data to users.

Passive information stored in the archive may include properties deemed useful for later understanding of the archived data, but which are not necessarily processed by an engine. Examples of passive information can include but are not limited to:

version number of the data object;
definition of the field(s);
time of data vaulting;
time of initial data creation;
status as original (master) data or data copy;
source of the data; and
many others.

According to embodiments, the processing engine of the big data platform is leveraged to create and populate the vault with archived data objects. An example of this vaulting process is described in connection with the example below.

FIG. 1 also shows the database as being in communication with the big data platform. This communication may be in the form of a data aging process. As described herein, such a data aging process refers to the transfer of data from the database to the big data platform based upon considerations that may include an age of the data. This data aging avoids accumulating old/stale/infrequently accessed data within the relatively limited/expensive confines of the database designed to accommodate detailed querying.

As shown in FIG. 1, such data aging may differ from data archiving in a number of respects. One such respect is the form of storage of the data within the big data platform.

Specifically, in certain embodiments the structure of aged data object may be preserved in the big data platform. Such tight coupling between the aged data and external data can facilitate its rapid recall to the database if necessary. However, tight coupling may not afford certain benefits accrued from looser coupling between archived data and external data as is further described below.

Data aging executed by the database in conjunction with the big data platform, may also differ from data archiving with respect to the location of the aged data. That is, the aged data may be located in the big data platform outside of the vault.

Finally, the data aging process may not necessarily produce the associated reference data that is useful for archiving purposes. Rather, the location of the aged data in its existing form (lacking context information), may simply be shifted to the big data platform to serve as a most cost effective vessel for containing information.

Figure 2:
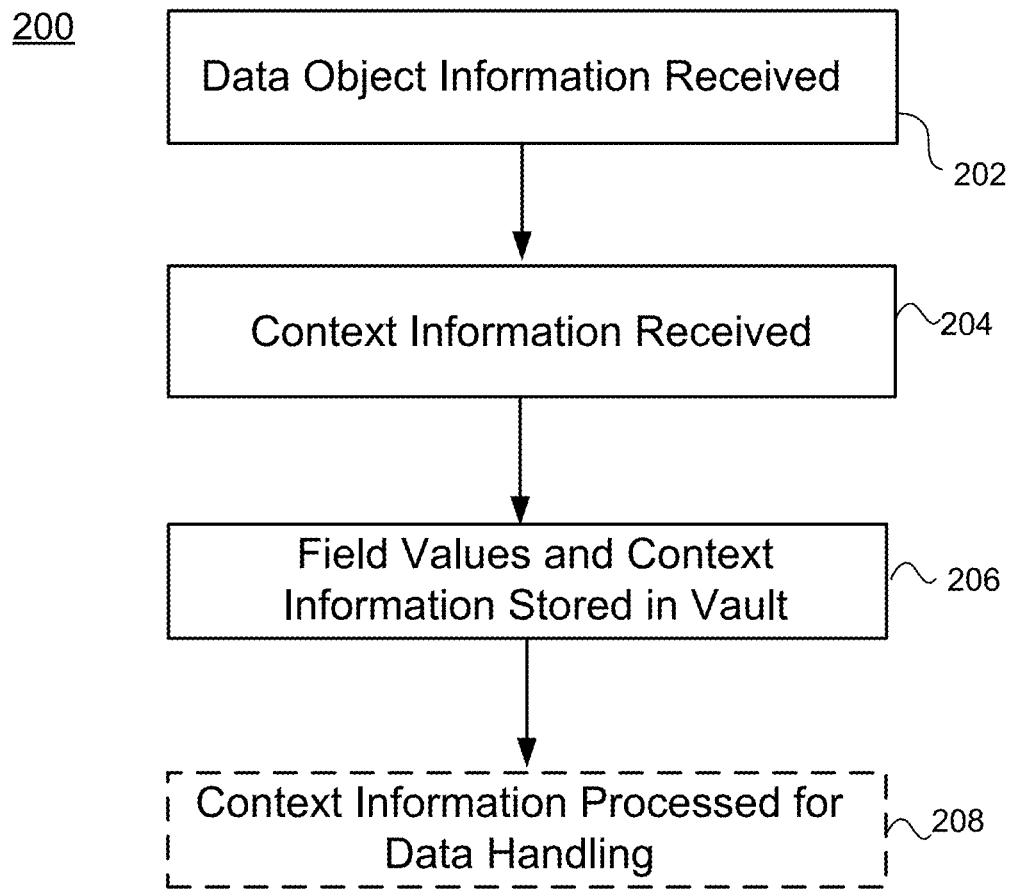
FIG. 2 shows a simplified process flow according to an embodiment.

FIG. 2 is a simplified flow diagram showing a method 200 according to an embodiment. In a first step 202, an engine of a big data platform receives as first input, a data object comprising various fields organized in a first structure.

In a second step 204, the engine receives a second input in the form of contextual information relevant to the data object. Such contextual information can include but is not limited to, time information, version information, source information, type information, and/or data object structure information.

In a third step 206, the engine causes the values of the fields to be stored in a vault of the big data platform, associated with the contextual information as a data object having a second structure. In certain embodiments the vault may comprise a cluster with storage and compute nodes. A subset of nodes may be established as vault catalog storing metadata that attributes the objects. Another node subset may be established as content nodes for storing the objects themselves.

In an optional fourth step 208, the contextual information may be processed by the engine in subsequent data handling of the second structure (e.g., read and/or write access, expiry, compliance, etc.)

Further details regarding implementation of archiving utilizing a big data platform according to embodiments, are now provided in connection with the following example.

EXAMPLE

Figure 3:
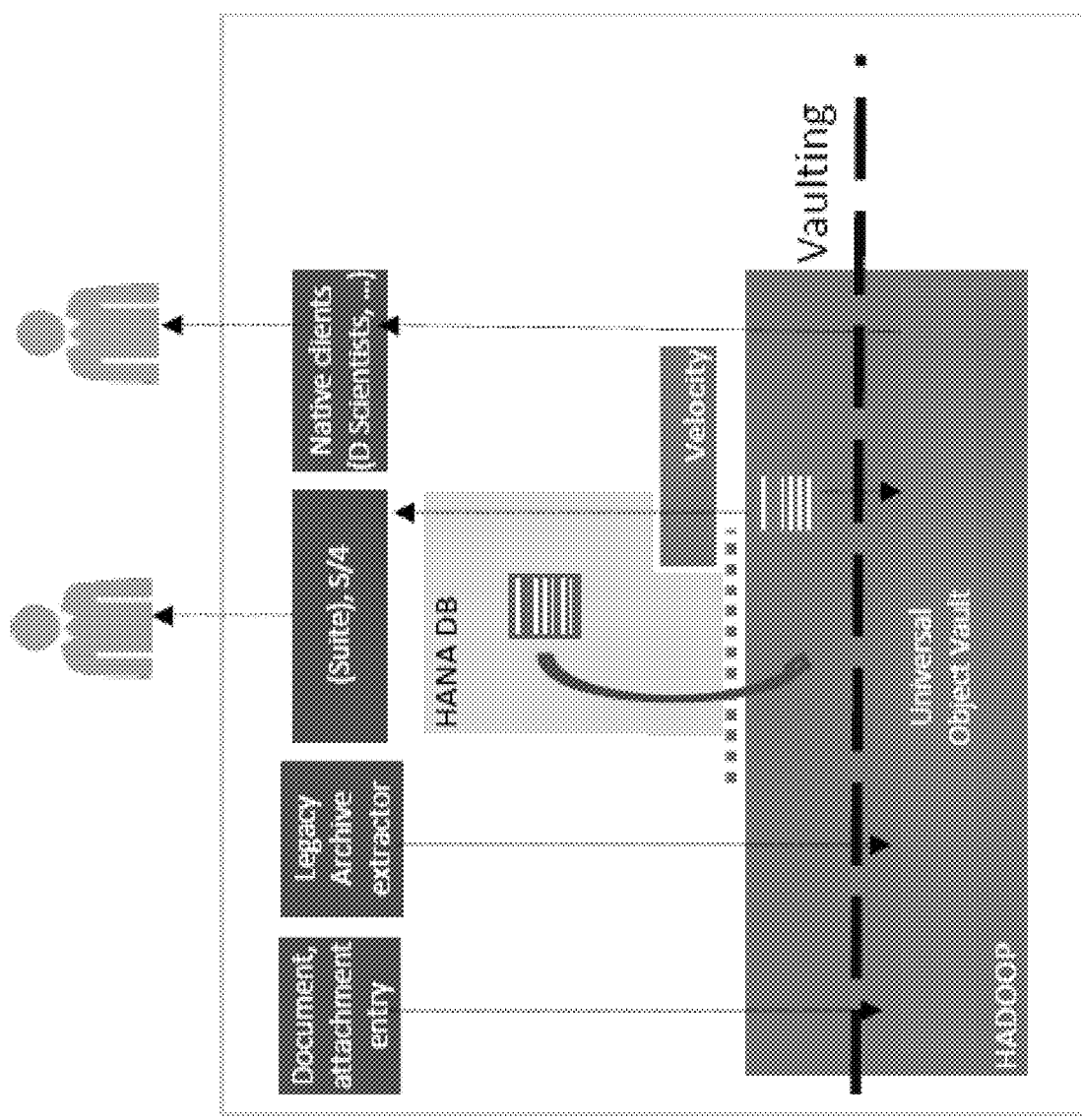
FIG. 3 shows a simplified view of an example of a system.

One example implementing archiving according to embodiments, is now described in connection with the HADOOP big data platform, available from the APACHE SOFTWARE FOUNDATION. FIG. 3 shows a simplified view of the system according to this example.

Here, HADOOP is utilized as a most cost efficient target infrastructure for storage. A Universal Object Vault (logical structure) is built in HADOOP so that the source, type, and context of the data is maintained, and metadata can be added that aids in searching for snapshots at a given time, versions etc.

FIG. 3 shows data archived in the vault of the big data platform, accessible to a variety of potential users, for a variety of potential purposes. For example, documents may be attached and entered into the vault for archiving directly. FIG. 3 also shows the input of data to the vault via a Legacy Archive extractor process, which is described further below.

FIG. 3 further shows access to data archived in the vault, by a native client. An example of such access could be by a data scientist who is seeking to perform analysis of the archived data.

The specific system shown in FIG. 3 further includes storage of data from overlying application(s)—(e.g., Suite, S/4 available from SAP SE of Walldorf, Germany)—utilizing the HANA in-memory database, also which are available from SAP SE. A VELOCITY engine is also employed as part of data handling including scale-out extension of the HANA in-memory database.

FIG. 3 further shows the HANA in-memory database utilizing the HADOOP platform for purposes of data aging. A shown by the short downward arrow, such data aging may or may not ultimately involve migration of aged data within the big data platform into the Universal Object Vault region itself.

Figure 4A:
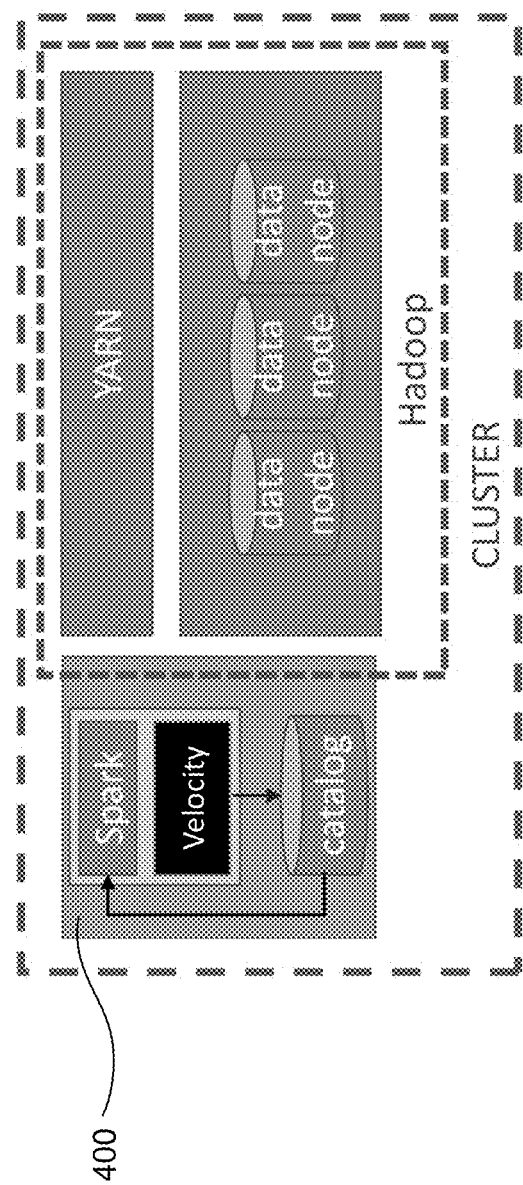
FIG. 4A illustrates an example orchestration of a simplified HADOOP cluster.

Specific implementation of the example of FIG. 3 is now described in connection with FIGS. 4A-4D. First, a HADOOP cluster is set up with storage and compute nodes. FIG. 4A illustrates an example orchestration of a simplified HADOOP cluster according to an embodiment, including a vault 400.

A subset of nodes is established as vault catalog (a structure for metadata that attributes the objects). Another subset is established as content nodes (storing the objects).

Finally, the catalog is made known to external processing engine (e.g., here the HANA SQL optimizer). Connectivity of clients/adaptors (e.g. HANA SQL query executor) to content is established using standard HADOOP APIs.

Figure 4B:
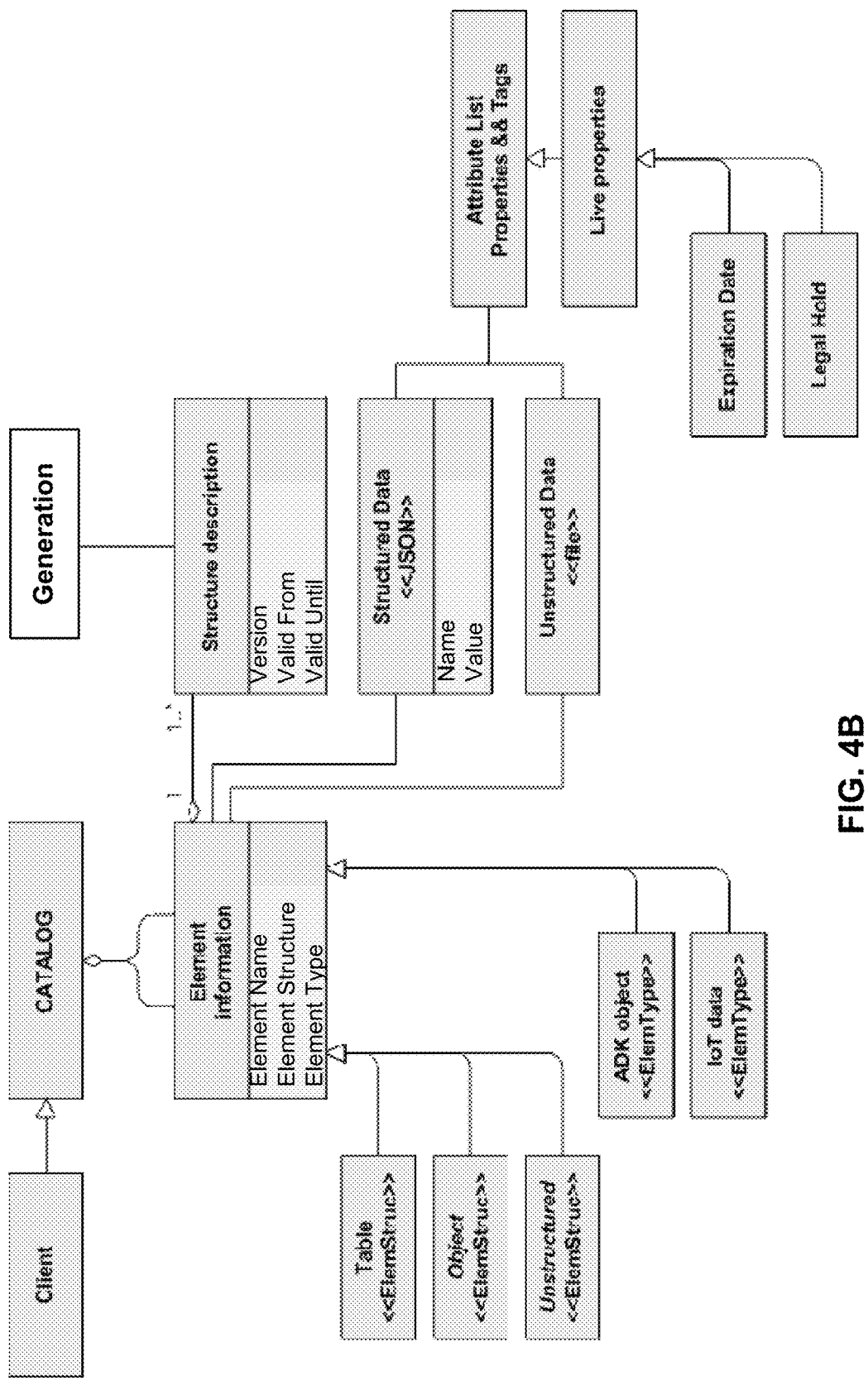
FIG. 4B shows a simplified view illustrating definition of the logical structure according to one embodiment.

FIG. 4B shows a simplified view illustrating definition of the logical structure of the vault according to one embodiment. This logical structure comprises different areas for content, and a collection of metadata in the vault catalog. As mentioned above, in certain embodiments some metadata types may be processed by the engine to actively control archive behavior during later data handling activities.

Examples of metadata can include but are not limited to:
source (system) of the objects;
type and subtype(s) of objects (e.g., structured purchase order, scanned invoice, Internet of Things—IoT sensor data stream of type xyz, attachment to . . . , etc.);
time of vaulting, time of creation;
indication of the data as a copy (snapshot), or original data moved being moved;
access policies;
lifecycle information (e.g., at least how long to keep the data, when to destroy at the latest, involved in a mitigation hold);
intra-object structure (properties, field length, data types).

A process for archiving data in the vault is now described. Relationally stored data is transformed into an object view to allow for object-based retrieval or object-wise operations (such as expiry/destruction in compliance with legal data privacy considerations), and to allow for references to unstructured data also stored such as attachments, sensor data, documents, streams.

This vaulting process allows conserving "informational relationship knowledge" over long periods of time (e.g., 5-30 years or even longer). By looking only at especially normalized relational database tables, one cannot reconstruct the "natural" business object. This is because foreign keys—the common practice for expressing relationships—are not typically part of a database schema.

In addition, there are joins present in the application coding to reconstruct objects, and also additional dependencies may be "hidden" in the applications. But, such applications change (and even disappear entirely) over time, such that the object structure may eventually be lost. This limits the interpretability and usability of the data over the long term.

By contrast, upon performance of the vaulting process according to embodiments, objects may be materialized. For example, FIG. 4C shows a sample of table data.

This example instance makes use of NoSQL structures (no strict relational representation as long-term data model). Accordingly, the table data of FIG. 4C may be denormalized, such as by serializing into the natural object structure (object-wise clustering by executing joins and materializing the result set, using an open format). An example of the denormalizing the table data of FIG. 4C, is shown in FIG. 4D.

While the particular example of FIG. 4D shows denormalization, other methods/formats are possible. Examples include but are not limited to, document store-like attribute/value pairs, XML serialization, JSON conversion, and Hive serialization/deserialization (SerDes).

Embodiments of vaulting process add context and meta data to preserve the history and interpretability of the primary data over decade-long time spans. Embodiments may also aid in eliminating redundant data stores. Possible examples include duplicate files of the SAP Data Retention Tool (DaRT) for tax and other audit purposes.

Embodiments may also provide extraction services that allow archiving of data from other sources. In connection with this example, such an extraction process may also be referred to as a Legacy Archive extractor process.

According to such extraction services for existing archives, the extracted information is stored in the same vault, allowing for cross queries over legacy data and data from other sources. This permits the application of new analysis techniques currently employed by, e.g. Data Scientists.

This example shows how SAP Installed Base customers may universally vault other archived data. SAP Archive Development Kit (ADK) archive files are fed into the vault structure by the following algorithm:

```
GET dictionary information from archive file
POPULATE Vault catalog with this info for assigned container
WHILE data objects in archive file DO
( GET next object
    WHILE records in data object DO
    ( GET record structure
        GET record values
    )
    SERIALZE object
    ADD meta data (time, archiving run, file, ...)
    WRITE into vault
)
```

The result is a uniform storage in the Universal Vault, that allows querying across vault containers independent of the original system. Note that this is not a simple relational reload (archives typically contain copies of data), with duplicate keys or different versions (of, e.g. master data) at a given point in time.

This historical context (with relaxed integrity constraints) is preserved by adding the suggested meta data. And, query processing on top of HADOOP Distributed File System (HDFS) is more flexible and scales well as compared with conventional archive indexing for static (prepared) searches over archived data.

According to embodiments, utilization of a vaulting processes with a vault structure constructed within a big data platform, may offer one or more benefits. One possible advantage is relatively loose coupling of information.

In particular, by not storing the archived data according to exactly the same structure as employed within the application layer and/or database, flexibility is imparted to the archiving system. For example, conversion of data outside the archive (e.g., to accommodate application and/or database upgrade) may be accomplished without necessarily requiring conversion of archived data within the vault at the same time.

Loose coupling between data internal/external to the archive vault, also facilitates possible desirable separation of backup and/or recovery functions. That is, the data in the application can be backed up and/or recovered, independent of the state of the data within the vault. Thus while under some circumstances the vault may be useful for such backup/recovery processes, under other circumstances separate mechanism(s) dedicated to performing backup/recovery may be better suited to those roles.

Loose coupling between data in the vault and data external thereto, may also promote data access. That is, such a configuration allows n:m server usage for client systems, permitting data archiving services to be offered to different clients.

It is further noted that the data archive vault is self-contained. That is, relational knowledge (even over decade-long periods) is conserved. Reference to object views of data within the vault, offers explicit recognition and appreciation of associated reference data (e.g., data versioning info, dates, other relevant metadata) providing context enrichment.

Such an approach may contrast with the state of data conventionally stored in a database. Specifically, a conventional database schema may not preserve this type of context information (e.g., foreign keys) at all, or may not store it in a consistent format amenable to preservation/access over (decade) long time periods.

It is also emphasized that data archive vaulting according to embodiments provides flexibility, in that the data is not required to come from one particular source (e.g., the suite of related business applications available from SAP). Rather, the archive can accommodate data from a heterogeneous mixture of sources, particularly considering implementation of the Legacy Archive Extractor process.

It is further noted that an archiving approach utilizing a vault within a big data platform according to embodiments, can readily be tailored to meet various compliance requirements (e.g., regulatory, contractual) arising within the data storage environment. Examples can include mandated data expiry/deletion of personal data, and restrictions in the subsequent modification of data subsequent to its initial storage.

It is further noted that a data archive vault implemented in a big data platform, and provide standard format/access (e.g. PARQUET, SPARK) for open processing by newly-developed applications.

Finally, a data archive vault may facilitate easier transition based on aging checks. That is, the power and flexibility associated with data archiving according to embodiments, may promote the performance of separate data aging processes in a more efficient and/or effective manner.

Figure 5:
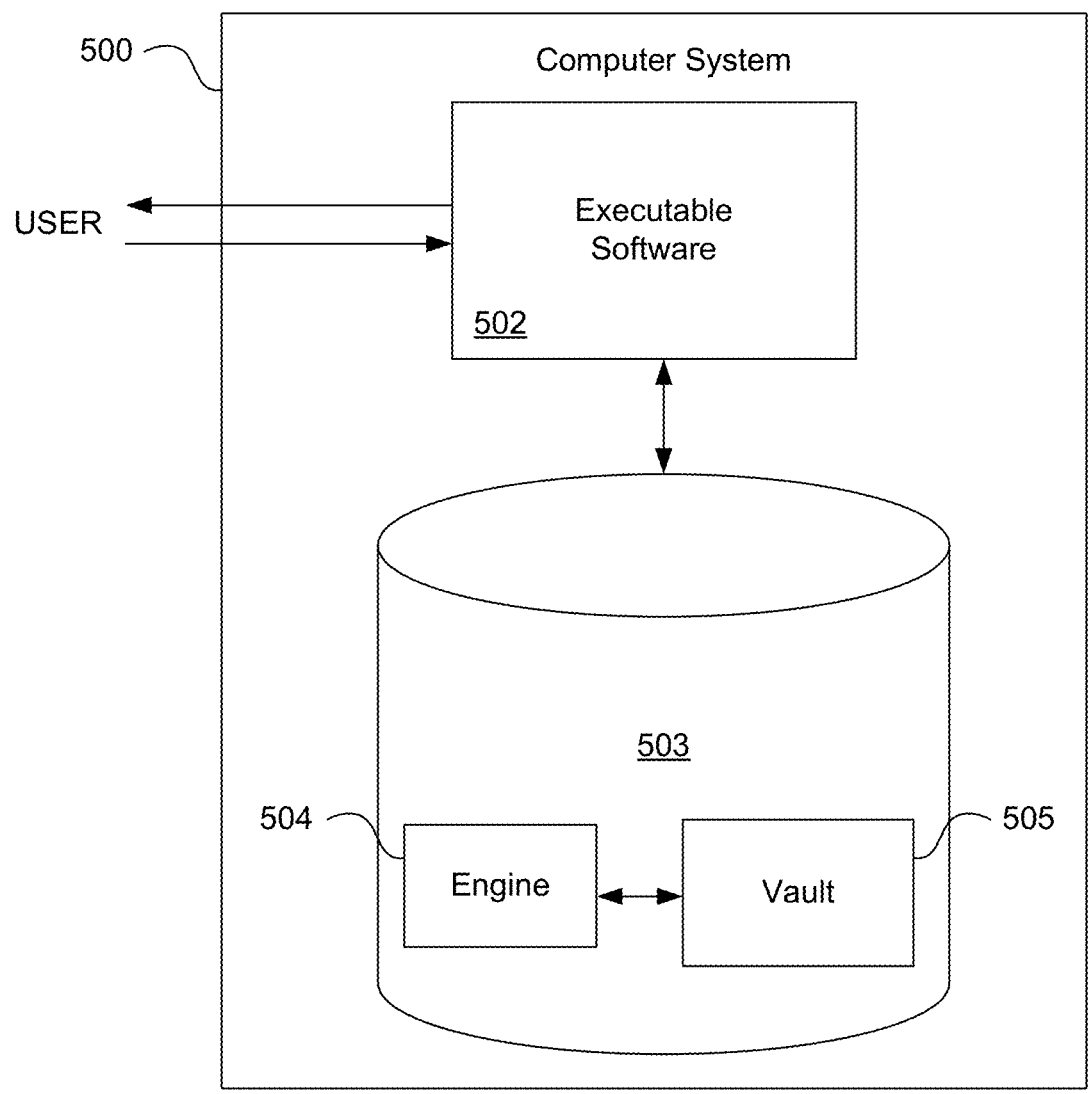
FIG. 5 illustrates hardware of a special purpose computing machine configured to perform archiving according to an embodiment.

FIG. 5 illustrates hardware of a special purpose computing machine configured to implement data archiving according to an embodiment. In particular, computer system 501 comprises a processor 502 that is in electronic communication with a non-transitory computer-readable storage medium 503. This computer-readable storage medium has stored thereon code 505 corresponding to a data archive vault. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However this is not required and in certain embodiments the engine may be implemented in other ways, for example as part of an overlying application layer.

Figure 6:
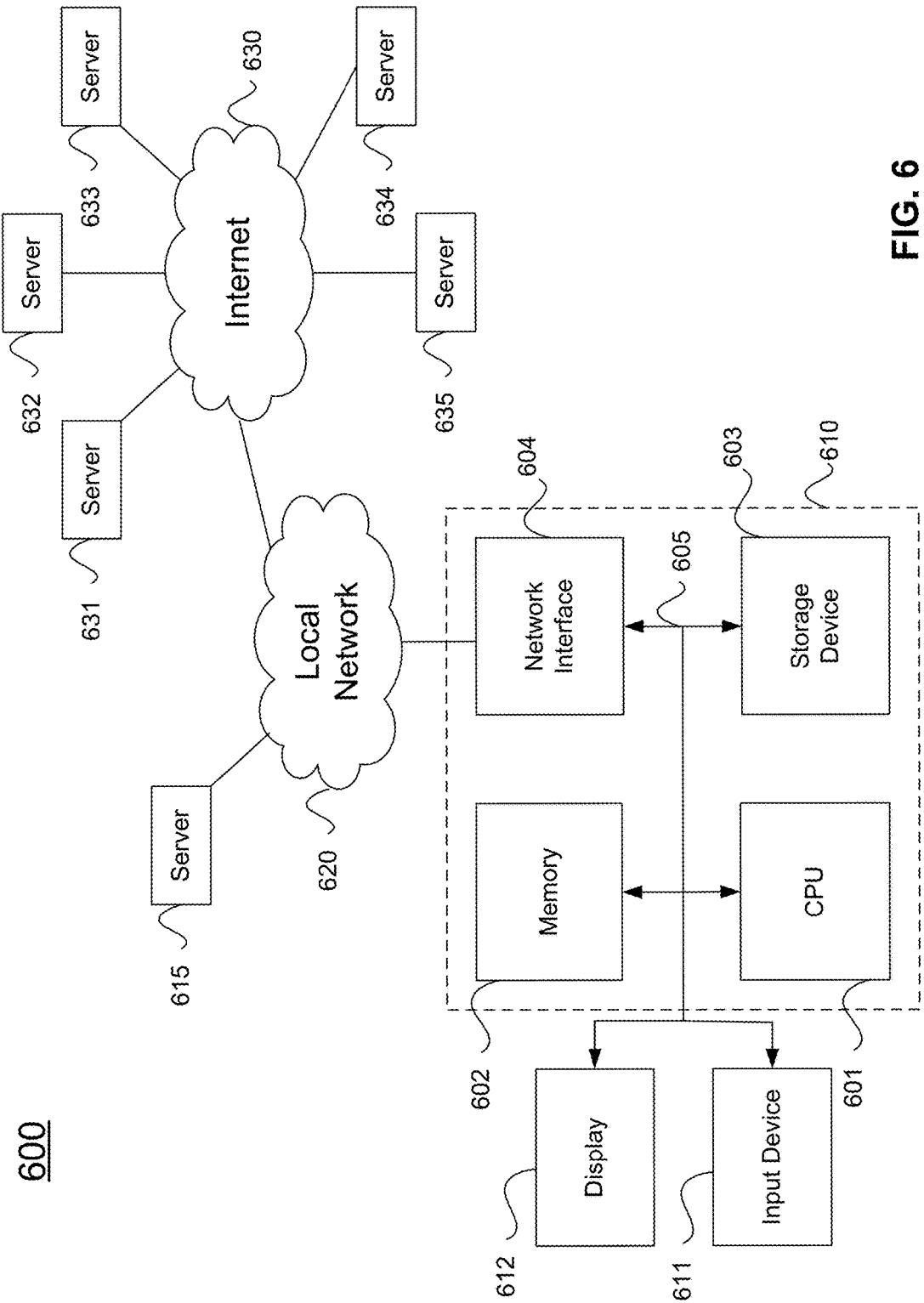
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    an engine of a big data platform receiving from an application layer, a first input comprising a plurality of fields organized in a first data structure;
    the engine receiving from the application layer, context information relevant to the first data structure, wherein the context information comprises version information identifying a specific version of software for which the first data structure was designed to be compatible;

the engine performing object-wise clustering by executing joins and materializing a result set to create denormalized values of the plurality of fields, wherein the result set includes the version information identifying the specific version of software for which the first data structure was designed to be compatible; and the engine storing in a vault of the big data platform, the denormalized values of the plurality of fields and the context information organized as a second data structure different from the first data structure.

2. A non-transitory computer readable storage medium embodying a computer program for performing a method, said method comprising:

an engine of a big data platform receiving a first input comprising a plurality of fields organized in a first data structure;

the engine receiving context information relevant to the first data structure, wherein the context information comprises version information identifying a specific version of software for which the first data structure was designed to be compatible;

the engine performing object-wise clustering by executing joins and materializing a result set to create denormalized values of the plurality of fields, wherein the result set includes the version information identifying the specific version of software for which the first data structure was designed to be compatible; and the engine storing in a vault of the big data platform, the denormalized values of the plurality of fields and the context information organized as a second data structure different from the first data structure.

3. A computer system comprising:

one or more processors;

a software program, executable on said computer system, the software program configured to cause an engine of a big data platform to:

receive a first input comprising a plurality of fields organized in a first data structure;

receive context information relevant to the first data structure, wherein the context information comprises version information identifying a specific version of software for which the first data structure was designed to be compatible;

perform object-wise clustering by executing joins and materializing a result set to create denormalized values, wherein the result set includes the version information identifying the specific version of software for which the first data structure was designed to be compatible; and store in a cluster of the big data platform, the denormalized values of the plurality of fields in a plurality of storage nodes, and store the context information in a vault catalog, organized as a second data structure different from the first data structure.

4. A method as in claim 1 wherein the vault comprises a cluster of storage nodes and calculation nodes.

5. A method as in claim 1 further comprising the engine handling the second data structure without processing the context information.

6. A method as in claim 1 further comprising the engine processing the context information to handle the second data structure.

7. A method as in claim 1 further comprising:

the engine receiving the first data structure from a database; and the engine aging the first data structure within the big data platform.

8. A non-transitory computer readable storage medium as in claim 2 wherein the vault comprises a cluster including a plurality of storage nodes.

9. A non-transitory computer readable storage medium as in claim 2 wherein the method further comprises the engine processing the context information to handle the second data structure.

10. A non-transitory computer readable storage medium as in claim 2 wherein the engine receives the first data structure from an application layer.

11. A non-transitory computer readable storage medium as in claim 2 wherein:

the engine receives the first data structure from a database; and the engine ages the first data structure within the big data platform.

12. A computer system as in claim 3 wherein the software program further includes code to cause the engine to process the context information in handling the second data structure.

13. A computer system as in claim 3 wherein the software program is further configured to cause the engine to age the first data structure received from a database.

14. A method as in claim 4 wherein the context information is stored in a catalog of the vault, and values of the plurality of fields are stored in a subset of the storage nodes.

15. A method as in claim 6 wherein the context information comprises compliance information.

16. A non-transitory computer readable storage medium as in claim 8 wherein the context information is stored in a vault catalog.

* * * * *